May 19, 1936.        E. H. LAND         2,041,138
PROCESS OF FORMING IMPROVED LIGHT POLARIZING BODIES
Original Filed March 10, 1930
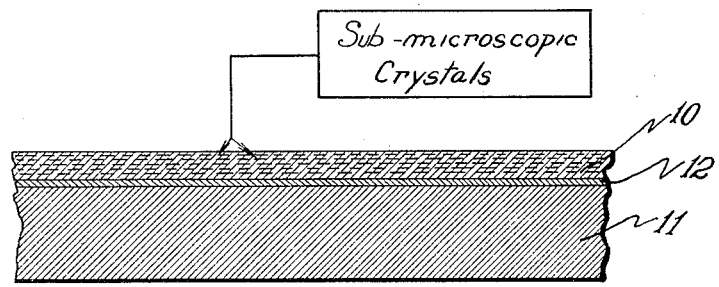
Edwin H. Land
INVENTOR
BY Brown & Jones
ATTORNEYS Patented May 19, 1936

2,041,138

UNITED STATES PATENT OFFICE 2,041,138

PROCESS OF FORMING IMPROVED LIGHT POLARIZING BODIES

Edwin H. Land, Wellesley Farms, Mass., assignor to Sheet Polarizer Company, Inc., Union City, N. J., a corporation of New Jersey Original application March 10, 1930, Serial No. 434,833. Divided and this application December 24, 1935, Serial No. 55,941

11 Claims. (Cl. 18—57)

This invention relates to a process of forming improved light polarizing bodies.

The invention has for its object generally an improved process for forming improved polarizing bodies of the character indicated which accomplish plane polarization of transmitted light with substantially a minimum of scattering.

More especially the object of the invention is to provide a process for manufacturing a light polarizing body made from a transparent suspending medium with a mass of polarizing particles dispersed therein and oriented and retained therein with their polarizing axes in substantial parallelism.

A further object is to provide such an improved process for forming polarizing bodies with viscous material containing minute polarizing particles by orienting the particles within the viscous material through the utilization as the orienting agent of the differential action between cohesion and adhesion when pouring or flowing the particle-containing, viscous material.

A still further object of the invention is to provide a process for orienting asymmetric particles suspended in a suitable medium by subjecting the medium and the suspended particles to a pouring action.

Other objects of the invention will in part be obvious and will in part appear hereafter.

The invention accordingly comprises the several steps and the relations of one or more of these steps with respect to each of the others which are exemplified in the following detailed disclosure and the scope of the application of which will be indicated in the claims.

This application is a division of my copending application Serial No. 434,833, filed March 10, 1930, for Refracting polarizing body and process of making the same.

For a fuller understanding of the nature and objects of the invention reference should be had to the following detailed description taken in connection with the accompanying drawing in which the figure is a fragmentary sectional view showing a section of a polarizing body which has been flowed or otherwise deposited on a suitable support, all on a greatly enlarged scale, and constructed in accordance with the present invention.

In the preferred embodiment of the present invention a polarizing body is preferably made in the form of a film or sheet by pouring or flowing past an edge a relatively viscous medium which contains a large mass of very small light polarizing bodies, such, for example, as dichroic transparent crystals. By pouring or flowing a viscous medium of this character it is seen that the crystals dispersed therein are subjected to a mechanical field of force which orients them. This mechanical field is that resulting from the differential action of the forces of cohesion and adhesion which act upon the crystals so that they turn until their long axes are substantially parallel to the direction of flow. The crystals employed should preferably be very small and asymmetric in shape. There is hereinafter set forth a method of forming such crystals of herapathite (sulphate of iodo-quinine) which have been found suitable for use in the process of this invention in the formation of light polarizing sheets.

It is intended that after the viscous medium has been poured or flowed and the crystals suspended therein oriented, the mass should ordinarily be hardened or set so as to retain the crystals in oriented position.

It is to be understood that the crystals employed should preferably be of very small size, for example, they should have preferably one dimension shorter than the wave lengths of light to be transmitted by the polarizing sheet. Such crystals are ordinarily invisible under the microscope. They may be termed colloidal or microscopic. Where such crystals are employed the scattering of light transmitted by the finished polarizing sheets is materially reduced. A microscopic examination of such a set viscous medium containing such minute particles shows it to be uniform and clear and substantially no scattering of transmitted light is detected.

In order to obtain films or sheets in ribbon form containing such crystals set in their oriented position from a pouring or flowing operation, the suspending medium employed should have substantially the maximum viscosity compatible with flow. Under such circumstances and where the medium carrying the suspended particles is poured or flowed as, for example, past an edge, smooth ribbons or sheets are obtained free from air-bubbles and blemishes, the pouring operation being adapted to supply ribbon-like polarizing bodies rapidly and in commercial quantities.

A viscous suspension adapted for pouring or flowing in accordance with the present invention is readily prepared by adding to a suitable supporting medium such, for example, as a nitro-cellulose solution or a cellulose acetate solution, a jelly-like mass containing minute asymmetric particles, such as colloidal herapathite crystalline material.

Such a jell may be obtained in the following manner: Take 1.5 grams of quinine bisulphate and dissolve the same in 50 cc. of methyl alcohol which may then be brought to a boil and stirred, preferably with an iron stirring rod. While being stirred, 0.525 gram of iodine as a 20% solution in alcohol are added. By forming the solution of herapathite in this manner the saturation is increased from 50% to 75% above normal. The stirring may be continued while a jell forms and until the mass has cooled. The herapathite is rapidly precipitated out of the solution as a jelly of interwoven sub-microscopic needles. Since this jelly is incorporated in a viscous suspending medium, such for example as a cellulosic medium, the needles are readily distributed therethrough. The jelly clots may be gradually pulled apart and the suspension finally appears perfectly clear. The process outlined above for the formation of the jelly gives needle-like particles of herapathite having their optical axes corresponding with their physical axes so that when the particles are aligned physically their optical or polarizing axes are also oriented.

Where a nitro-cellulose solution is employed as the suspending medium for the cool mass of colloidal herapathite it should preferably be one having a relatively high ratio of nitro-cellulose to solvent. Such a solvent may be made, for example, by dissolving a quantity of the finest grade of highly nitrated cotton in as little solvent as will dissolve it. A suitable solvent may be amyl- or butyl-acetate. The solution of nitro-cellulose is highly adhesive and when the mass of herapathite is added, it disrupts the plates into which the needle-like crystals of herapathite are tending to gather. As a consequence there can thus be produced a relatively highly dispersed mass of minute polarizing particles in a viscous menstruum which, when poured from a bowl or plate or otherwise subjected to flow, as for example, to flow past an edge, forms a ribbon-like sheet containing crystals which are oriented so as to have their polarizing axes in substantial parallelism and which when set has the polarizing properties desired.

Commercial polarizing bodies may preferably be made in the form of a relatively thin sheet or film comprising the suspending medium and the minute particles dispersed therein. If desired, the polarizing body may itself be permanently or detachably fixed to a suitable support, preferably transparent, as for example, to a plate of glass or to a sheet of celluloid. Such a support may be desirable with conditions where it is found that the polarizing body itself may require some form of protection.

In the drawing such a construction is shown. 10 denotes the polarizing body which is represented as a film of a transparent medium having properly oriented therein minute particles of the desired character. As shown, this film is supported or superimposed upon any ordinary transparent body 11 which may be glass.

Where the polarizing body is poured or flowed on to a support in a still somewhat fluid condition it may be desirable to interpose between the polarizing body and the support a layer of a preferably transparent body 12 which may have preferably substantially the same viscosity as that of the polarizing body.

If the material 12 is kept in a somewhat fluid condition until the polarizing body has been distributed thereon, the entrapment of bubbles beneath the layer of the polarizing body may be avoided. This coating 12 may be of any suitable material, as for example a thin layer of fluid celluloid or dibutyl phthalate. It may, if desired, be adhesive, serving to unite the polarizing body with the transparent support. This latter quality is not essential and the polarizing body may be permitted to set or harden while in contact with the coating 12 and later be removed from contact therewith.

In the specification and claims reference to a set suspending medium or to a hardened suspending medium will be understood as implying merely such a change in the characteristics of the medium as will prevent movement of the particles therein from their oriented positions. It will be further understood that while the suspending medium has been described as a cellulose in a solvent, this description has been intended to cover the dispersion of the cellulosic material in the so-called solvent.

It is to be understood also that any suitable dispersing material may be employed as the dispersing medium for the polarizing particles and other solvents may be employed for said dispersion mediums provided, however, that the solvent should be a non-solvent for the polarizing particles carried in the suspension and the solvent and the suspending medium should be light transmitting.

It is also to be understood that while herapathite is mentioned as the preferred material from which the polarizing particles are obtained, any other suitable material may be employed. The periodides of the sulphates of cinchonine, cinchonidine or quinidine are known to be of the same class as herapathite.

Since certain changes in carrying out the above process may be made without departing from its scope, it is intended that the matter contained in the above disclosure shall be broadly interpreted and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The process of producing polarizing bodies which comprises preparing a suspending medium, introducing thereinto a mass of polarizing particles which are asymmetric in shape, dispersing said particles throughout said medium, orienting the polarizing axes of said particles by flowing said medium past an edge, and retaining said particles in oriented position by setting said medium.

2. The process of producing polarizing bodies which comprises preparing a suspending medium comprising a cellulosic material and a non-solvent of herapathite, preparing a suspension of herapathite, introducing said suspension into said medium, dispersing said herapathite throughout said medium, orienting the polarizing axes of said herapathite particles to substantial parallelism, and setting said medium to retain said particles in oriented position.

3. The process of producing polarizing bodies which comprises providing a fluid suspending medium, introducing into said medium a mass of asymmetric polarizing particles, orienting the polarizing axes of said particles by flowing said medium, depositing said medium upon a fluid support, and setting or hardening said medium while in contact with said support to retain the polarizing axes of said particles in substantial parallelism.

4. The process of producing polarizing bodies, which comprises providing a fluid suspending medium, introducing into said medium a mass of asymmetric particles of heraphathite, orienting the polarizing axes of said particles to substantial parallelism, by flowing said medium past an edge, depositing said medium upon a fluid support, and setting or hardening said medium while in contact with said support to retain the polarizing axes of said particles in substantial parallelism.

5. The process of producing polarizing bodies, which comprises providing a fluid suspending medium of a cellulosic material and a suitable solvent, introducing a multiplicity of minute polarizing particles into said medium, orienting the polarizing axes of said particles by flowing said medium, depositing said medium upon a fluid support, and setting or hardening said medium while in contact with said support to retain the polarizing axes of said particles in substantial parallelism.

6. The process of producing polarizing bodies, which comprises providing a fluid suspending medium of nitro-cellulose and ethyl acetate, introducing and dispersing in said medium a mass of asymmetric herapathite particles, orienting the polarizing axes of said particles by flowing said medium, depositing said medium upon a fluid support, and setting or hardening said medium while in contact with said support to retain the polarizing axes of said particles in substantial parallelism.

7. The process of producing polarizing bodies, which comprises forming a suspension of minute particles of herapathite, preparing a suspending medium comprising nitro-cellulose and an acetate non-solvent of herapathite, distributing the herapathite suspension throughout the suspending medium, flowing the suspending medium to orient the polarizing axes of the particles therein, and setting the suspending medium to retain said particles in oriented position.

8. The process of preparing polarizing bodies, which comprises preparing a suspension of minute particles of herapathite in an alcohol, preparing a suspending medium comprising nitro-cellulose, incorporating and dispersing the herapathite suspension in the suspending medium, flowing the suspending medium past an edge to orient the particles, and setting the suspending medium to retain the particles in oriented position.

9. The process of producing polarizing bodies which comprises providing a fluid suspending medium, introducing into said medium a mass of needle-like polarizing particles, orienting the polarizing axes of said particles by flowing said medium, depositing said medium upon a fluid support, and setting said medium while in contact with said support to retain the polarizing axes of said particles in substantial parallelism.

10. The process of producing polarizing bodies which comprises providing a fluid suspending medium, introducing into said medium a mass of needle-like polarizing particles, orienting the polarizing axes of said particles to substantial parallelism by flowing said medium past an edge, and setting said medium immovably to retain said polarizing particles in substantial parallelism.

11. The process of producing polarizing bodies which comprises providing a suspending medium, introducing into said medium a mass of needle-like polarizing particles, orienting the polarizing axes of said particles to substantial parallelism by flowing said medium, and setting said medium to retain said particles in oriented position.

EDWIN H. LAND.